United States Patent
Schoepper

(10) Patent No.: US 6,182,939 B1
(45) Date of Patent: Feb. 6, 2001

(54) TELESCOPIC BICYCLE SEAT POST SYSTEM

(76) Inventor: Ralph William Schoepper, 3305 Allan Road, North Vancouver, BC (CA), V7J 3C6

( * ) Notice: Under 35 U.S.C. 154(b), the term of this patent shall be extended for 0 days.

(21) Appl. No.: 09/452,314

(22) Filed: Dec. 1, 1999

(51) Int. Cl.$^7$ .................................................. F16M 13/00
(52) U.S. Cl. .......................................... 248/599; 280/278
(58) Field of Search .............................. 248/125.8, 159, 248/161, 410, 411, 631; 267/132; 280/287, 161, 283, 278; D12/119

(56) References Cited

U.S. PATENT DOCUMENTS

| | | |
|---|---|---|
| D. 379,783 | 6/1997 | Thomson et al. . |
| 2,566,387 | 9/1951 | Vick . |
| 2,644,504 | 7/1953 | Vick . |
| 2,710,207 * | 6/1955 | Mueller ................................ 403/373 |
| 3,885,881 * | 5/1975 | Goldmann ........................... 403/291 |
| 4,067,589 * | 1/1978 | Hon ..................................... 280/278 |
| 4,422,663 * | 12/1983 | Hon ..................................... 280/278 |
| 4,429,890 * | 2/1984 | Hon ..................................... 280/259 |
| 4,429,891 * | 2/1984 | Hon ..................................... 280/278 |
| 4,433,852 * | 2/1984 | Hon ..................................... 280/278 |
| 4,438,942 * | 3/1984 | Hon ..................................... 280/278 |
| 4,448,435 * | 5/1984 | Hon ..................................... 280/278 |
| 4,462,606 * | 7/1984 | Hon ..................................... 280/278 |
| 4,807,856 | 2/1989 | Teckenbrock . |
| 5,011,174 | 4/1991 | Ross-Clunis . |
| 5,657,958 * | 8/1997 | McLaughlin ........................ 248/632 |
| 5,713,555 | 2/1998 | Zurfluh et al. . |
| 5,794,828 * | 8/1998 | Colan et al. . |
| 6,116,629 * | 9/2000 | Koppensteiner .................... 280/287 |

* cited by examiner

Primary Examiner—Anita M. King
Assistant Examiner—N. Sanders

(57) ABSTRACT

A telescopic bicycle seat post system for permitting raising and lowering of a bicycle seat post over a wide range of lengths to adjust the overall height of the seat. The telescopic bicycle seat post system includes tubular upper and lower elongate members each having opposite upper and lower ends. The upper end of the lower elongate member telescopically receives therein the lower end of the upper elongate member. The lower end of the lower elongate member is designed for insertion into an upper opening of a seat tube of a bicycle frame. The upper end of the upper elongate member is designed for coupling a bicycle seat thereto. A generally c-shaped extension clamp is disposed around the lower elongate member adjacent the upper end of the lower elongate member. The extension clamp releasably holds the upper elongate member in a fixed position with respect to the lower elongate member.

14 Claims, 3 Drawing Sheets

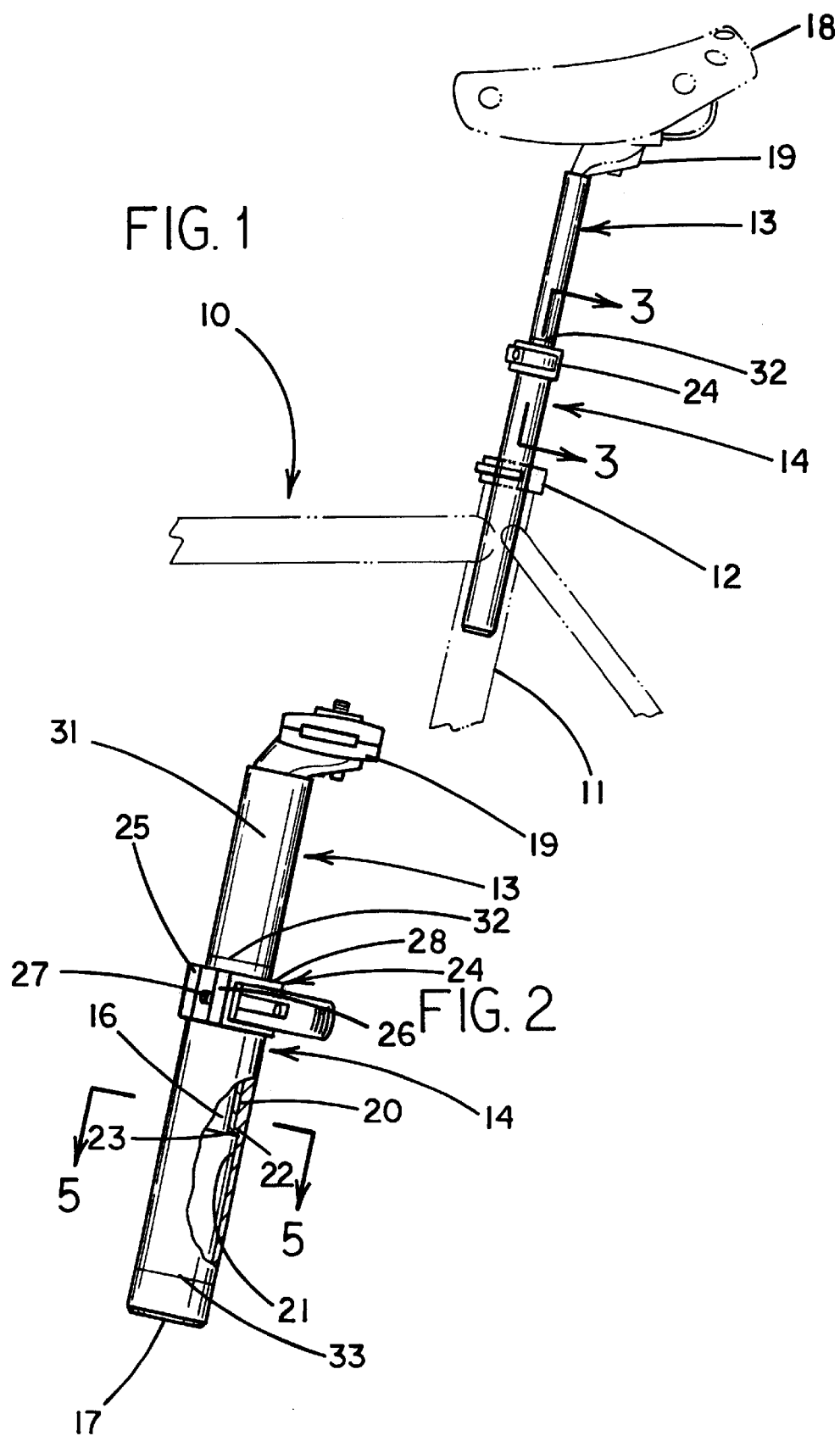

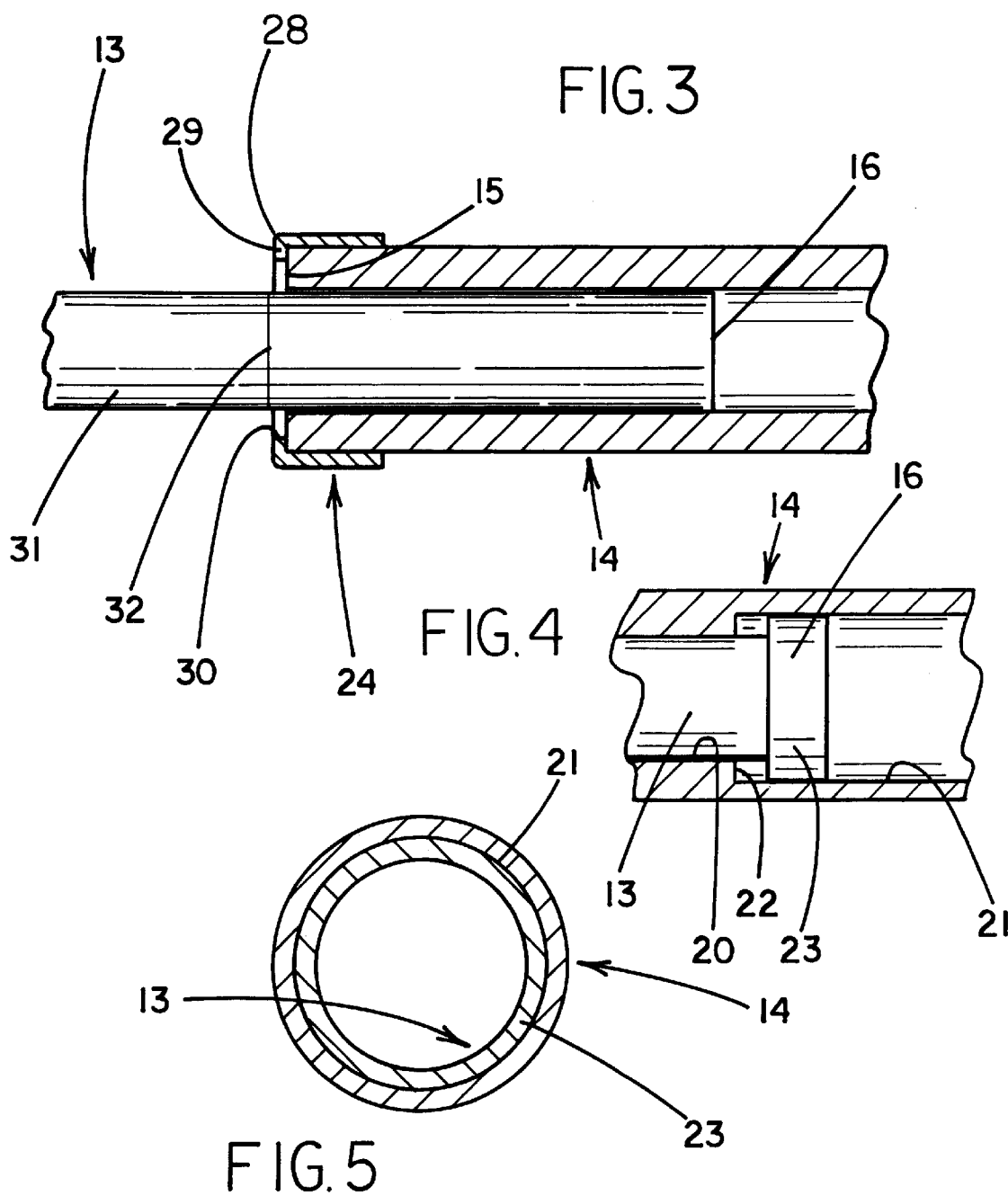

TELESCOPIC BICYCLE SEAT POST SYSTEM

BACKGROUND OF THE INVENTION

1. Field of the Invention

The present invention relates to telescopic bicycle seat posts and more particularly pertains to a new telescopic bicycle seat post system for permitting raising and lowering of a bicycle seat post over a wide range of lengths to adjust the overall height of the seat.

2. Description of the Prior Art

Bicycle frames typically include seat tubes for receiving a lower end of a seat post on which a seat is mounted. The extension of the seat post out of the seat tube is almost always adjustable, with a variable portion of the seat post being situated in the seat tube of the frame. Typically, the seat post has been adjusted once for the primary rider of the bicycle, and rarely, if ever, adjusted after that initial adjustment. The seat tube of the bicycle frame has extended downwardly to the crank housing, and thus the seat tube has heretofore typically provided enough interior length to accept a seat post of sufficient length to provide acceptable adjustment of the distance between the seat and the top opening of the seat tube of the frame.

Various seat post devices have been developed for supporting the seat, including the known prior art of U.S. Pat. No. 5,713,555; U.S. Pat. No. 4,807,856; U.S. Pat. No. 2,566,387; U.S. Pat. No. 5,011,174; U.S. Pat. No. 2,644,504; and U.S. Pat. No. Des. 379,783. These devices include various telescopic structures with locking means for locking the seat post at two or more discrete seat post extension positions, and suspension systems integrated into the seat post assembly.

Recent developments in the art have changed the seat adjustment needs of the bicycle user and the structure of the seat tube of the bicycle frame. Many bicycle riders now find it necessary to frequently switch between at least two seat height positions for various types of bicycle riding, such as, for example, for technical riding (which generally requires a relatively lower seat height adjustment) and normal riding (which generally requires a relatively higher seat height adjustment). Thus, easy and quick seat height adjustment on a frequent basis has become a concern for many bicycle riders. Further, recently developed bicycle frame designs often incorporate a suspension for the rear wheel of the bicycle. Many of these frame designs significantly shorten the length of the seat tube of the bicycle frame to accommodate the suspension system. As a result, only much shorter seat post lengths may be accommodated in the seat tube, which is especially a problem if the seat needs to be adjusted to a relatively lower height with respect to the frame.

What has been lacking in the art is a relatively compact, lightweight, and easy to adjust seat post assembly that meets the requirements of recently-evolving riding styles and bicycle frame styles, while avoiding the complexity of some of the solutions heretofore proposed by the art.

SUMMARY OF THE INVENTION

In view of the foregoing disadvantages inherent in the known types of telescopic bicycle seat posts now present in the prior art, the present invention provides a new telescopic bicycle seat post system construction wherein the same can be utilized for permitting raising and lowering of a bicycle seat post over a wide range of lengths to adjust the overall height of the seat.

The general purpose of the present invention, which will be described subsequently in greater detail, is to provide a new telescopic bicycle seat post system apparatus and method which has many of the advantages of the telescopic bicycle seat posts mentioned heretofore and many novel features that result in a new telescopic bicycle seat post system which is not anticipated, rendered obvious, suggested, or even implied by any of the prior art telescopic bicycle seat posts, either alone or in any combination thereof.

To attain this, the present invention generally comprises tubular upper and lower elongate members each has opposite upper and lower ends. The upper end of the lower elongate member telescopically receives therein the lower end of the upper elongate member. The lower end of the lower elongate member is designed for inserting into an upper opening of a seat tube of a bicycle frame. The upper end of the upper elongate member is designed for coupling a bicycle seat thereto. A generally c-shaped extension clamp is disposed around the lower elongate member adjacent the upper end of the lower elongate member. The extension clamp releasably holds the upper elongate member in a fixed position with respect to the lower elongate member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new telescopic bicycle seat post system apparatus and method which has many of the advantages of the telescopic bicycle seat posts mentioned heretofore and many novel features that result in a new telescopic bicycle seat post system which is not anticipated, rendered obvious, suggested, or even implied by any of the prior art telescopic bicycle seat posts, either alone or in any combination thereof.

It is another object of the present invention to provide a new telescopic bicycle seat post system which may be easily and efficiently manufactured and marketed.

It is a further object of the present invention to provide a new telescopic bicycle seat post system which is of a durable and reliable construction.

An even further object of the present invention is to provide a new telescopic bicycle seat post system which is susceptible of a low cost of manufacture with regard to both materials and labor, and which accordingly is then susceptible of low prices of sale to the consuming public, thereby making such telescopic bicycle seat post system economically available to the buying public.

Still yet another object of the present invention is to provide a new telescopic bicycle seat post system which provides in the apparatuses and methods of the prior art some of the advantages thereof, while simultaneously overcoming some of the disadvantages normally associated therewith.

Still another object of the present invention is to provide a new telescopic bicycle seat post system for permitting raising and lowering of a bicycle seat post over a wide range of lengths to adjust the overall height of the seat.

Yet another object of the present invention is to provide a new telescopic bicycle seat post system which includes tubular upper and lower elongate members each has opposite upper and lower ends. The upper end of the lower elongate member telescopically receives therein the lower end of the upper elongate member. The lower end of the lower elongate member is designed for inserting into an upper opening of a seat tube of a bicycle frame. The upper end of the upper elongate member is designed for coupling a bicycle seat thereto. A generally c-shaped extension clamp is disposed around the lower elongate member adjacent the upper end of the lower elongate member. The extension clamp releasably holds the upper elongate member in a fixed position with respect to the lower elongate member.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic side view of a new telescopic bicycle seat post system according to the present invention.

FIG. 2 is a schematic breakaway side view of an embodiment of the seat post assembly.

FIG. 3 is a schematic cross sectional view of an embodiment of the seat post assembly without the stop taken from line 3—3 of FIG. 1.

FIG. 4 is a schematic cross sectional view of the embodiment of the present invention illustrated in FIG. 2 at a similar vantage to that of FIG. 3.

FIG. 5 is a schematic cross sectional view taken from line 5—5 of FIG. 2.

DETAILED DESCRIPTION OF THE INVENTION

Figure 6:
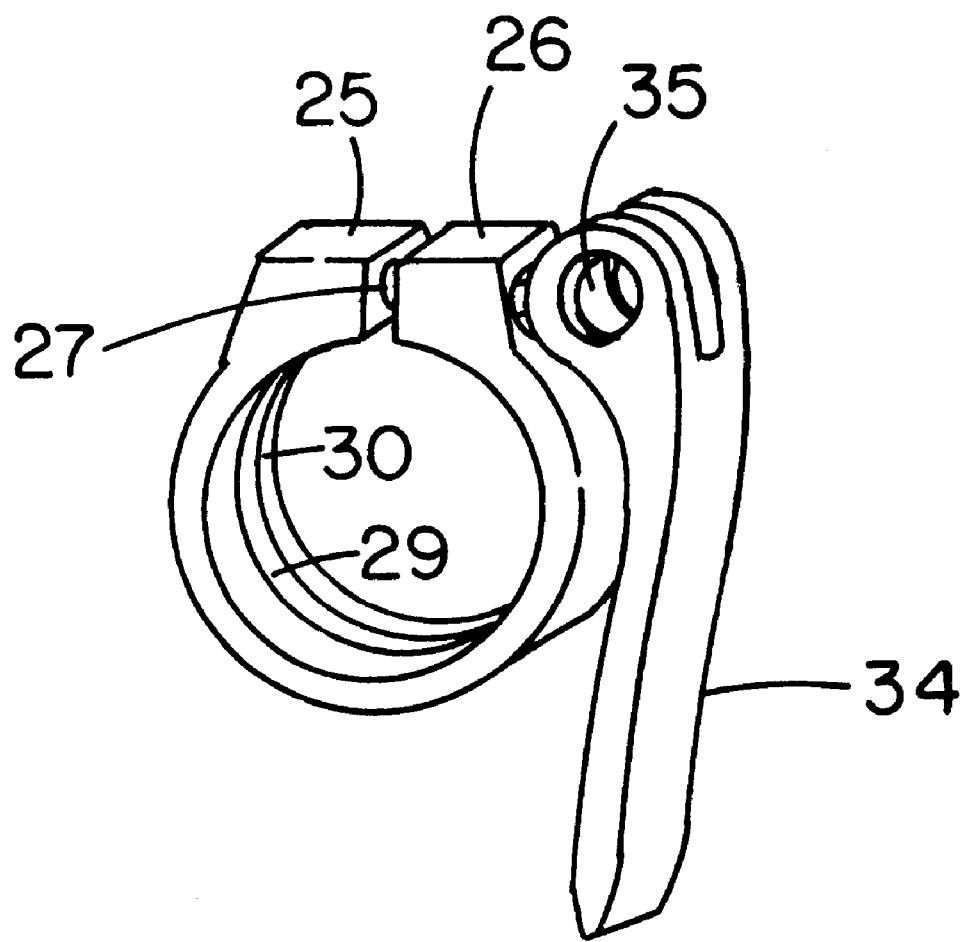
FIG. 6 is a schematic perspective view of the extension clamp removed from the upper and lower elongate members of the invention.

With reference now to the drawings, and in particular to FIGS. 1 through 6 thereof, a new telescopic bicycle seat post system embodying the principles and concepts of the present invention will be described.

As best illustrated in FIGS. 1 through 6, the telescopic bicycle seat post system generally comprises tubular upper and lower elongate members each opposite upper and lower ends. The upper end of the lower elongate member telescopically receives therein the lower end of the upper elongate member. The lower end of the lower elongate member is designed for inserting into an upper opening of a seat tube of a bicycle frame. The upper end of the upper elongate member is designed for coupling a bicycle seat thereto. A generally C-shaped extension clamp is disposed around the lower elongate member adjacent the upper end of the lower elongate member. The extension clamp releasably holds the upper elongate member in a fixed position with respect to the lower elongate member.

As illustrated in FIG. 1, the telescopic bicycle seat post system is designed for bicycles having a bicycle frame 10 with a seat tube 11 having an upper opening therein designed for receiving a seat post of a bicycle seat therein. The seat tube has a generally C-shaped seat post clamp 12 mounted thereto adjacent the upper opening of the seat tube designed for securing a seat post inserted into the upper opening of the seat tube.

The system also includes a telescopic seat post assembly comprising resilient tubular upper and lower elongate members 13, 14 each having opposite upper and lower ends. The upper end 15 of the lower elongate member telescopically receives therein the lower end 16 of the upper elongate member to permit selective telescopic extension and retraction of the upper elongate member from the upper end of the lower elongate member. The lower end 17 of the lower elongate member is inserted into the upper opening of the seat tube.

The seat post clamp of the seat tube of the bicycle frame is disposed around the lower elongate member to secure the lower elongate member in the seat post. The upper end of the upper elongate member has a bicycle seat 18 coupled thereto. In one embodiment, the upper end of the upper elongate member has a seat mounting clamp 19 coupled thereto which couples the bicycle seat to the upper end of the upper elongate member.

The lower elongate member has an inner surface defining a lumen of the lower elongate member. With reference FIGS. 2, 4 and 5, in an embodiment of the invention, the inner surface of the lower elongate member may have upper and lower regions 20, 21, and a shoulder 22 formed between the upper and lower regions of the inner surface of the lower elongate member. In this embodiment, the lower end of the upper elongate member has a stop 23 coupled thereto and disposed in a lower space defined by the lower region of the inner surface of the lower elongate member. In use, the upper elongate member is slidable out of the upper end of the lower elongate member until the stop abuts the shoulder to prevent further removal of the upper elongate member from the lower elongate member.

In one embodiment, the upper and lower elongate members may be generally cylindrical in shape. In this embodiment, the upper and lower regions of the inner surface of the lower elongate member are generally cylindrical in shape with the lower region of the inner surface of the lower elongate member having a diameter greater than a diameter of the upper region of the inner surface of the lower elongate member to define the shoulder of the inner surface of the lower elongate member. The shoulder in this embodiment is generally ring-shaped. Additionally, in this embodiment, the stop of the upper elongate member is generally disk-shaped and has an outer diameter greater than the diameter of the upper region of sad inner surface of the lower elongate member.

With reference to FIGS. 1, 2, 3 and 6, a generally C-shaped extension clamp 24 is disposed around the lower elongate member adjacent the upper end of the lower elongate member. In use, the extension clamp is designed for constricting against the upper end 15 of the lower elongate member 14 and a portion of the length of the upper elongate member 13 for selectively holding the upper elongate member in a fixed position with respect to the lower elongate member. The extension clamp has a pair of opposing ends, and each respective end has an outwardly extending tab 25, 26. A threaded pinch bolt 27 is extended through coaxial holes in the tabs to advance the tabs together. The hole in a first 25 of the tabs has a threaded interior adapted to threadedly engage the threaded exterior of the pinch bolt 27. The hole in a second 26 of the tabs is adapted to permit the pinch bolt 27 to slip through the hole with significant resistance. An actuating lever 34 of the clamp 24 is pivotable on a pin 35 which has a hole that is threaded and threadedly receives the threaded end of the pinch bolt 27. The end of the actuating lever 34 is adapted to act as an eccentric cam that presses the second tab 26 toward the first tab 25 when the lever is rotated toward the main body of the clamp, and releases the pressing force when the lever is rotated away from the main body of the clamp.

In use, rotating the lever toward the main body of the clamp advances the pinch bolt 27 in a first direction to move the tabs close to one another to constrict the extension clamp around the upper end of the lower elongate member and an adjacent portion of the upper elongate member to hold the upper elongate member in a fixed position with respect to the lower elongate member. Conversely, rotating the lever away from the main body of the clamp advances the pinch bolt in a second direction opposite the first direction to move the tabs apart from one another to loosen the extension clamp from around the upper end of the lower elongate member and an adjacent portion of the upper elongate member to permit sliding of upper elongate member in an out of the lower elongate member. Significantly, the extension clamp permits the upper elongate member to be selectively positioned at almost an infinite number of positions with respect to the lower elongate member, and quick repositioning of the upper elongate member may be effected by a simple rotation of the lever 34 of the clamp.

With reference to FIG. 3, in one embodiment, the extension clamp may have a generally C-shaped upper edge 28 with an inwardly radiating resting flange 29. The resting flange rests on the upper end of the lower elongate member to properly position the extension clamp adjacent the upper end of the lower extension member.

The resting flange has an inner edge 30 defining an inner radius of the resting flange. The upper end of the lower elongate member has inner and outer radii, the inner radius is defined by the upper region of the inner surface of the lower elongate member and the outer radius is defined by an outer surface of the lower elongate member. In one embodiment, the inner radius of the resting flange may be equal to the sum of the inner radius of lower elongate member plus one-half the difference between the inner and outer radii of the lower elongate member.

In one embodiment of the invention, the upper elongate member may have an outer surface 31 with an indicator line 32 displayed therearound between the upper and lower ends of the upper elongate member for indicating a predetermined minimum insertion length between the indicator line and the lower end of the upper elongate member at which the upper elongate member should be inserted into the upper end of the lower elongate member.

Optionally, the outer surface of the lower elongate member may have a mounting indicator line 33 displayed therearound between the upper and lower ends of the lower elongate member for indicating a predetermined minimum insertion length between the mounting indicator line and the lower end of the lower elongate member at which the lower elongate member should be inserted into the upper opening of the seat tube of the bicycle frame.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A seat post assembly for insertion into an upper opening of a seat tube of a bicycle frame, said seat post assembly comprising:

tubular upper and lower elongate members each having opposite upper and lower ends;

said upper end of said lower elongate member telescopically receiving therein said lower end of said upper elongate member;

said lower end of said lower elongate member being adapted for insertion into an upper opening of a seat tube of a bicycle frame;

said upper end of said upper elongate member being adapted for coupling a bicycle seat thereto;

a generally c-shaped extension clamp being disposed around said lower elongate member adjacent said upper end of said lower elongate member, said extension clamp releasably holding said upper elongate member in a fixed position with respect to said lower elongate member;

said upper elongate member having an outer surface, said outer surface of said upper elongate member having an indicator line displayed therearound between said upper and lower ends of said upper elongate member for indicating a predetermined minimum insertion length between said indicator and said lower end of said upper elongate member at which said upper elongate member should be inserted into said upper end of said lower elongate member; and an outer surface of said lower elongate member having a mounting indicator line displayed therearound between said upper and lower ends of said lower elongate member for indicating a predetermined minimum insertion length between said mounting indicator line an said lower end of said lower elongate member at which said lower elongate member should be inserted into the upper opening of the seat tube of the bicycle frame.

2. The seat post assembly of claim 1, wherein said upper end of said upper elongate member has a seat mounting clamp coupled thereto, said seat mounting clamp being adapted for coupling the bicycle seat to said upper end of said upper elongate member.

3. The seat post assembly of claim 1, wherein said lower elongate member has an inner surface, said inner surface of said lower elongate member having upper and lower regions, and a shoulder formed between said upper and lower regions of said inner surface of said lower elongate member, wherein said lower end of said upper elongate member has a stop coupled thereto and disposed in a lower space defined by said lower region of said inner surface of said lower elongate member, said upper elongate member being slidable out of said upper end of said lower elongate member until said stop abuts said shoulder to prevent further removal of said upper elongate member from said lower elongate member.

4. The seat post assembly of claim 3, wherein said upper and lower elongate members are generally cylindrical in shape, wherein said upper and lower regions of said inner surface of said lower elongate member are generally cylindrical in shape, said lower region of said inner surface of said lower elongate member having a diameter greater than a diameter of said upper region of said inner surface of said lower elongate member to define said shoulder of said inner surface of said lower elongate member, wherein said shoulder is generally ring-shaped, and wherein said stop of said upper elongate member is generally disk-shaped and has an outer diameter greater than said diameter of said upper region of said inner surface of said lower elongate member.

5. The seat post assembly of claim 1, wherein said extension clamp has a generally C-shaped upper edge, said upper edge of said extension clamp having an inwardly radiating resting flange, said resting flange resting on said upper end of said lower elongate member to position said extension clamp adjacent said upper end of said lower extension member.

6. The seat post assembly of claim 5, wherein said resting flange has an inner edge defining an inner radius of said resting flange, wherein said upper end of said lower elongate member has inner and outer radii, said inner radius being defined by said upper region of said inner surface of said lower elongate member and said outer radius being defined by an outer surface of said lower elongate member, and wherein said inner radius of said resting flange is equal to the sum of said inner radius of lower elongate member plus one-half the difference between said inner and outer radii of said lower elongate member.

7. The seat post assembly of claim 5, wherein said extension clamp has a pair of opposing ends each having an outwardly extending tab, and wherein a pinch bolt is extended through said tabs to connect said tabs together.

8. A telescopic bicycle seat post system, comprising:

a bicycle frame having a seat tube, the seat tube of the bicycle frame having an upper opening therein adapted for receiving a seat post of a bicycle seat therein;

said seat tube having a generally C-shaped seat post clamp mounted thereto adjacent said upper opening of said seat tube adapted for securing a seat post inserted into said upper opening of said seat tube;

a telescopic seat post assembly comprising:

tubular upper and lower elongate members each having opposite upper and lower ends;

said upper end of said lower elongate member telescopically receiving therein said lower end of said upper elongate member to permit selective telescopic extension and retraction of said upper elongate member from said upper end of said lower elongate member;

said lower end of said lower elongate member being inserted into said upper opening of said seat tube;

said upper end of said upper elongate member having a bicycle seat coupled thereto;

wherein said upper end of said upper elongate member has a seat mounting clamp coupled thereto, said seat mounting clamp coupling said bicycle seat to said upper end of said upper elongate member;

said seat post clamp being disposed around said lower elongate member for securing said lower elongate member in said seat post;

said lower elongate member having an inner surface defining a lumen of said lower elongate member, said inner surface of said lower elongate member having upper and lower regions, and a shoulder formed between said upper and lower regions of said inner surface of said lower elongate member;

said lower end of said upper elongate member having a stop coupled thereto and disposed in a lower space defined by said lower region of said inner surface of said lower elongate member;

said upper elongate member being slidable out of said upper end of said lower elongate member until said stop abuts said shoulder to prevent further removal of said upper elongate member from said lower elongate member;

wherein said upper and lower elongate members are generally cylindrical in shape;

wherein said upper and lower regions of said inner surface of said lower elongate member are generally cylindrical in shape, said lower region of said inner surface of said lower elongate member having a diameter greater than a diameter of said upper region of said inner surface of said lower elongate member to define said shoulder of said inner surface of said lower elongate member;

said shoulder being generally ring-shaped;

wherein said stop of said upper elongate member is generally disk-shaped and has an outer diameter greater than said diameter of said upper region of said inner surface of said lower elongate member;

a generally c-shaped extension clamp being disposed around said lower elongate member adjacent said upper end of said lower elongate member, said extension clamp being adapted for holding said upper elongate member in a fixed position with respect to said lower elongate member;

said extension clamp having a pair of opposing ends each having an outwardly extending tab;

a threaded pinch bolt being extended through said tabs to connect said tabs together;

wherein advancing said pinch bolt in a first direction moves said tabs close to one another to constrict said extension clamp around said upper end of said lower elongate member and an adjacent portion of said upper elongate member to hold said upper elongate member in a fixed position with respect to said lower elongate member;

wherein advancing said pinch bolt in a second direction opposite said first direction moves said tabs away from one another to loosen said extension clamp from around said upper end of said lower elongate member to permit sliding of said upper elongate member in and out of said lower elongate member;

said extension clamp having a generally C-shaped upper edge, said upper edge of said extension clamp having an inwardly radiating resting flange, said resting flange resting on said upper end of said lower elongate member to position said extension clamp adjacent said upper end of said lower extension member;

said resting flange having an inner edge defining an inner radius of said resting flange;

said upper end of said lower elongate member having inner and outer radii, said inner radius being defined by said upper region of said inner surface of said lower elongate member and said outer radius being defined by an outer surface of said lower elongate member; and said inner radius of said resting flange being equal to the sum of said inner radius of lower elongate member plus one-half the difference between said inner and outer radii of said lower elongate member;

said upper elongate member having an outer surface, said outer surface of said upper elongate member of said upper elongate member having an indicator line displayed therearound between said upper and lower ends of said upper elongate member for indicating a predetermined minimum insertion length between said indicator and said lower end of said upper elongate member at which said upper elongate member should be inserted into said upper end of said lower elongate member; and said outer surface of said lower elongate member having a mounting indicator line displayed therearound between said upper and lower ends of said lower elongate member for indicating a predetermined minimum insertion length between said mounting indicator line an said lower end of said lower elongate member at which said lower elongate member should be inserted into said upper opening of said seat tube of said bicycle frame.

9. A telescopic bicycle seat post system, comprising:

a bicycle frame having a seat tube, the seat tube of the bicycle frame having an upper opening therein;

a telescopic seat post assembly comprising:

tubular upper and lower elongate members each having opposite upper and lower ends;

said upper end of said lower elongate member telescopically receiving therein said lower end of said upper elongate member to permit selective telescopic extension and retraction of said upper elongate member from said upper end of said lower elongate member for a providing a first seat post adjustment;

said lower end of said lower elongate member being telescopically received in said upper opening of said seat tube to permit selective telescopic extension and retraction of said lower elongate member from said seat tube for a providing a second seat post adjustment;

a seat post clamp mounted to said seat tube adjacent said upper opening of said seat tube for selectively fixing the protrusion of said lower elongate member from said seat tube;

an extension clamp disposed around said lower elongate member adjacent to said upper end of said lower elongate member, said extension clamp being adapted for selectively fixing the protrusion of said upper elongate member from the upper end of said lower elongate member;

said upper elongate member having an outer surface, said outer surface of said upper elongate member having an indicator line displayed therearound between said upper and lower ends of said upper elongate member for indicating a predetermined minimum insertion length between said indicator and said lower end of said upper elongate member at which said upper elongate member should be inserted into said upper end of said lower elongate member; and an outer surface of said lower elongate member having a mounting indicator line displayed therearound between said upper and lower ends of said lower elongate member for indicating a predetermined minimum insertion length between said mounting indicator line an said lower end of said lower elongate member at which said lower elongate member should be inserted into said upper opening of said seat tube of said bicycle frame.

10. The telescopic seat post system of claim 9 additionally comprising a bicycle seat coupled to said upper end of said upper elongate member.

11. The telescopic seat post system of claim 9 additionally comprising a seat mounting clamp coupled to said upper end of said upper elongate member for coupling said bicycle seat to said upper end of said upper elongate member.

12. The telescopic seat post system of claim 9 wherein said lower elongate member has an inner surface, said inner surface of said lower elongate member having upper and lower regions, and a shoulder formed between said upper and lower regions of said inner surface of said lower elongate member.

13. The telescopic seat post system of claim 12 wherein said lower end of said upper elongate member has a stop coupled thereto and disposed in a lower space defined by said lower region of said inner surface of said lower elongate member, and wherein said upper elongate member is slidable out of said upper end of said lower elongate member until said stop abuts said shoulder to prevent further removal of said upper elongate member from said lower elongate member.

14. The telescopic seat post system of claim 9 said extension clamp has a pair of opposing ends each having an outwardly extending tab, and a threaded pinch bolt extended through said tabs to connect said tabs together, said extension clamp having a generally C-shaped upper edge, said upper edge of said extension clamp having an inwardly radiating resting flange, said resting flange resting on said upper end of said lower elongate member to position said extension clamp adjacent said upper end of said lower extension member.

* * * * *